(12) United States Patent
Kobayashi

(10) Patent No.: US 11,139,513 B2
(45) Date of Patent: Oct. 5, 2021

(54) CATALYST PART, AND VENTILATION FILTER, VENTILATION PLUG, AND LEAD-ACID BATTERY INCLUDING THE SAME

(71) Applicant: W. L. Gore & Associates G. K., Tokyo (JP)

(72) Inventor: Kotaro Kobayashi, Tokyo (JP)

(73) Assignee: W. L. Gore & Associates G.K., Tokyo (JP)

(*) Notice: Subject to any disclaimer, the term of this patent is extended or adjusted under 35 U.S.C. 154(b) by 197 days.

(21) Appl. No.: 16/098,083

(22) PCT Filed: May 2, 2017

(86) PCT No.: PCT/JP2017/017961
§ 371 (c)(1),
(2) Date: Oct. 31, 2018

(87) PCT Pub. No.: WO2017/191848
PCT Pub. Date: Nov. 9, 2017

(65) Prior Publication Data
US 2019/0140326 A1    May 9, 2019

(30) Foreign Application Priority Data
May 2, 2016  (JP) .............................. JP2016-092828

(51) Int. Cl.
*H01M 10/52* (2006.01)
*H01M 10/12* (2006.01)
(Continued)

(52) U.S. Cl.
CPC ...... *H01M 10/523* (2013.01); *B01D 53/8671* (2013.01); *H01M 10/12* (2013.01);
(Continued)

(58) Field of Classification Search
CPC .................................................. H01M 10/523
See application file for complete search history.

(56) References Cited

U.S. PATENT DOCUMENTS

| 4,294,895 A * | 10/1981 | Atkins ................ H01M 2/1205 |
| | | 220/373 |
| 4,374,907 A | 2/1983 | Chuang et al. |
| (Continued) | | |

FOREIGN PATENT DOCUMENTS

| CN | 102800831 A | 11/2012 |
| JP | 40727/1973 | 5/1973 |
| (Continued) | | |

OTHER PUBLICATIONS

International Search Report and Written Opinion from International Application No. PCT/JP2017/017961 dated Jul. 4, 2017.

*Primary Examiner* — Tracy M Dove
(74) *Attorney, Agent, or Firm* — Greenberg Traurig, LLP

(57) ABSTRACT

Provided is a catalyst part for a lead-acid battery, the catalyst part being capable of reducing gas release from an electrolyte solution and a decrease in electrolyte solution due to the leakage, thus providing a lead-acid battery having a long life. Also provided are a ventilation filter, a ventilation plug, and a lead-acid battery each including the catalyst part. A catalyst part for a lead-acid battery, including a catalyst layer including a catalyst to accelerate a reaction for generating water or water vapor from oxygen and hydrogen, and an arrangement through which at least part of the water or water vapor is condensed and/or flowed back to the inside of the battery.

19 Claims, 3 Drawing Sheets

(51) Int. Cl.
*H01M 50/383* (2021.01)
*H01M 50/30* (2021.01)
*H01M 50/60* (2021.01)
*B01D 53/86* (2006.01)

(52) U.S. Cl.
CPC ....... *H01M 10/121* (2013.01); *H01M 50/383* (2021.01); *H01M 50/394* (2021.01); *H01M 50/668* (2021.01); *B01D 2257/104* (2013.01); *B01D 2257/108* (2013.01); *Y02E 60/10* (2013.01)

(56) References Cited

U.S. PATENT DOCUMENTS 7,326,489 B2   2/2008  Jones et al.
9,997,807 B2 * 6/2018  Fegely .................. F16L 23/003

FOREIGN PATENT DOCUMENTS

| JP | 42029/1973 | 5/1973 |
| JP | U1973-40727 | 5/1973 |
| JP | U1973-042029 | 5/1973 |
| JP | 141342/1979 | 10/1979 |
| JP | U1979-141342 | 10/1979 |
| JP | S62-098559 A | 5/1987 |
| JP | 62-193058 | 8/1987 |
| JP | 1987-193058 | 8/1987 |
| JP | H05277333 A | 10/1993 |
| JP | H11-345605 A | 12/1999 |
| JP | 2006-059730 | 5/2006 |
| JP | 4715089 | 4/2011 |
| JP | 2013-004436 | 1/2013 |

\* cited by examiner

Inclined baffle

Diffusion channel

Depth of cut

Gas Presure

CATALYST PART, AND VENTILATION FILTER, VENTILATION PLUG, AND LEAD-ACID BATTERY INCLUDING THE SAME

RELATED APPLICATIONS

The present application is a national phase filing under 35 USC 371 of International Application No. PCT/JP2017/017961, filed on May 2, 2017, which claims the priority of Japanese Patent Application No. 2016-092828, filed on May 2, 2016, the entire contents and disclosures of which are hereby incorporated by reference.

TECHNICAL FIELD

The present invention relates to catalyst parts for lead-acid batteries and ventilation filters, more preferably to a catalyst part for a lead-acid battery, which catalyst part prevents the decrease in electrolyte solution and enables long life, a ventilation filter including the catalyst part, a ventilation plug including the catalyst part, and a lead-acid battery including the catalyst part.

BACKGROUND ART

Lead-acid batteries, in particular, automotive lead-acid batteries generally employ an open structure in which an electrolyte solution such as dilute sulfuric acid can freely flow. Lead-acid batteries having such a structure, when charged, generate oxygen and hydrogen gas and therefore need a vent port for discharging these gases. Otherwise, the gas pressure inside the battery would increase, which may lead to deformation and breakage of the battery. Lead-acid batteries having a vent port, if tipped over, may cause an electrolyte solution to leak through the vent port. In addition, in the case of an automotive lead-acid battery, an electrolyte solution may be shaken by the vibration of a running car and thereby cause the electrolyte solution to leak through the vent port.

Such leakage of gases or sprays through the vent port leads to a decrease in electrolyte solution. The decrease in electrolyte solution results in an insufficient chemical reaction of battery and leads to a reduced charge capacity and discharge capacity.

In response to these problems, various efforts have hitherto been made.

Patent Literature 1, discloses providing a battery that never causes leakage even when fell over and is easy to handle, discloses a battery including a vent hole covered with a water-repellent porous membrane, the vent hole being located above the liquid level in the battery when the battery is fell over.

Patent Literature 2, discloses providing a vent structure of a lead-acid battery, the structure preventing an overflow due to vibration and a deformation and a rupture due to an increase in pressure inside the battery, discloses a vent structure including a vent hole at the top and an inclined gas permeable membrane at the bottom.

Patent Literature 3 discloses providing, in addition to a vent port (porous filter), a polyethylene separator containing a predetermined amount of oil to prevent clogging of the vent port and an abnormal rise of the battery internal pressure due to clogging. It is described that a larger amount of oil tends to cause clogging to swell and deform a battery jar, whereas a smaller amount of oil tends to reduce the oxidation resistance of the separator to break the separator.

Patent Literature 4 discloses providing a lead-acid battery that, when tipped over, is capable of preventing an electrolyte solution from leaking out and the amounts of electrolyte solution in cell chambers in a battery jar from becoming non-uniform, and flowing back liquid by providing a functional membrane having a specific structure that allows gas to pass, but not liquid.

Patent Literature 5, aiming to provide a lead-acid battery that is excellent in gas exhaustion and electrolyte solution loss prevention and, in addition, never causes leakage of electrolyte solution even when the battery is fell over, discloses employing a structure in which an exhaust chamber and a cell-communicating chamber are partitioned and separated by barriers except that the exhaust chamber and the cell-communicating chamber are communicated with each other through a cutout in each barrier, through which structure electrolyte solutions condensed in the exhaust chamber are flowed back.

Patent Literature 6 discloses a catalyst device to recombine decomposed gases from electrolyte solution.

This catalyst device has the ability to filter out catalytic poisons (acidic electrolyte solutions) and control the recombination temperature. More particularly, the catalyst device includes a porous section that allows gas to pass, but not liquid, to prevent catalytic poisons (e.g., acidic electrolyte solutions) from reaching the catalyst. It is described that gases that have passed through the porous section reach the catalyst site and recombine there, and can be flowed back through the porous section.

CITATION LIST

Patent Literature

Patent Literature 1: Japanese Laid-open Patent Publication No. 62-98559
Patent Literature 2: Japanese Laid-open Patent Publication No. 11-345605
Patent Literature 3: Japanese Laid-open Patent Publication No. 2006-59730
Patent Literature 4: Japanese Laid-open Patent Publication No. 2013-4436
Patent Literature 5: Japanese Laid-open Patent Publication No. 2013-4436
Patent Literature 6: U.S. Pat. No. 7,326,489B

SUMMARY OF INVENTION

Problems to be Solved by the Invention

Patent Documents 1 to 3 disclose providing a vent port with a porous membrane in order to prevent the leakage of electrolyte solution. This method may prevent the leakage of electrolyte solution but may fail to prevent the passage of decomposed gas from the electrolyte solution or the evaporation of moisture, and thus may fail to prevent the decrease in electrolyte solution.

In addition to preventing the leakage of electrolyte solution, Patent Documents 4 and 5 each disclose flowing back the mist accumulated in an exhaust chamber into a battery. This, however, complicates the structure of the exhaust chamber. Furthermore, this approach may also fail to prevent the decrease of electrolyte solution because decomposed gas from the electrolyte solution may pass and leak out.

Patent Literature 6 discloses recombining decomposed gas from an electrolyte solution using a catalyst and flowing back the recombined substance to the inside of a battery. The catalyst device of Patent Literature 6, however, includes a porous section that allows gas to pass, but not liquid, on the side of the electrolyte solution in order to protect the catalyst against catalytic poisons (e.g., acidic electrolyte solutions). Thus, to flow back the substance recombined at the catalyst site to the inside of the battery, it is necessary to control the temperature to be relatively high (approximately 70° C. to 90° C.) so that the recombined substance can remain gaseous. This is because if the recombined substance is liquid, it may fail to pass through the porous section (which allows gas to pass, but not liquid) and flow back to the inside of the battery. Thus, the catalyst device of Patent Literature 6 can be used in environments where charging is carried out continuously, such as for backup, but not in environments where charging is carried out discontinuously and the temperature is uncontrollable. For example, the device of Patent Literature 6 is not suitable for automotive lead-acid batteries, which are not necessarily used while being continuously charged and may be used in cold districts.

A decrease in electrolyte solution results in an insufficient chemical reaction of battery and leads to a reduced charge capacity and discharge capacity. While not wishing to be bound by any particular theory, the increased concentration of dilute sulfuric acid in an electrolyte solution may cause a positive plate to corrode to reduce the capacity, and the decreased electrolyte solution level may expose plates to rapidly reduce the discharge capacity and further corrode the joint between a negative plate and a strap.

Furthermore, the decrease in electrolyte solution may also lead to sulfation and penetration short-circuiting. Sulfation is a phenomenon where lead sulfate generated by discharge may not be sufficiently resolved into lead dioxide and lead by charge to form a bulk crystal of lead sulfate. Such a bulk crystal, which is difficult to reduce into a metal lead, reduces battery performance and shortens battery life. In addition, such a bulk crystal is involved also in penetration short-circuiting. Bulk crystals grow on an electrode into a needle crystal called "dendrite". If the dendrite keeps on growing, it may reach the other electrode to cause a short circuit. This is penetration short-circuiting, which makes it impossible to charge and discharge the battery anymore.

Particularly in recent years, automobiles having idling stop systems for improving fuel economy have been increasingly used. Lead-acid batteries used in idling stop vehicles supply power to all the devices such as an air-conditioner and a fan during the idling stop. Thus, the lead-acid batteries tend to be undercharged and used at a low state of charge as compared with conventional starting lead-acid batteries, leading to sulfation and penetration short-circuiting. Sulfation and penetration short-circuiting can be prevented by preventing the decrease in electrolyte solution.

In view of the circumstances described above, it is an object of the present invention to provide a catalyst part for a lead-acid battery, the catalyst part being capable of reducing gas release from an electrolyte solution and a decrease in electrolyte solution due to the leakage, thus providing a lead-acid battery having a long life.

Means for Solving the Problems

The present invention provides the following aspects.

[1] A catalyst part for a lead-acid battery, including a catalyst layer including a catalyst to accelerate a reaction for generating water or water vapor from oxygen and hydrogen, and an arrangement through which at least part of the water or water vapor is condensed and/or flowed back to the inside of the battery, wherein the catalyst part is gas permeable as a whole.

[2] The catalyst part according to Aspect 1, further including a member capable of promoting the condensation of at least part of the water or water vapor, on the catalyst layer.

[3] The catalyst part according to Aspect 2, wherein the condensation-promoting member is a hydrophilic porous member.

[4] The catalyst part according to Aspect 3, wherein the hydrophilic porous member is made of expanded polytetrafluoroethylene subjected to a hydrophilization treatment.

[5] The catalyst part according to Aspect 4, wherein a metal oxide gel is used for the hydrophilization treatment.

[6] The catalyst part according to any one of Aspects 1 to 5, further including a wall member extending from the adjacence to the periphery of the first hydrophobic porous member toward the inside of the lead-acid battery, wherein at least part of the water or water vapor generated by the catalysis is able to be condensed on the wall member.

[7] The catalyst part according to any one of Aspects 1 to 6, wherein at least part of the arrangement is arranged on the periphery of the catalyst layer.

[8] The catalyst part according to any one of Aspects 1 to 7, wherein the catalyst layer includes a hydrophobic porous member.

[9] The catalyst part according to any one of Aspects 1 to 8, wherein a catalyst support supporting the catalyst is arranged in the cavities or on the surface of the pores of the catalyst layer.

[10] The catalyst part according to Aspect 9, wherein the catalyst layer is made by mixing the catalyst support with polytetrafluoroethylene and then making porous the mixture thereof.

[11] The catalyst part according to Aspect 9 or 10, wherein the catalyst layer is made by mixing the catalyst support with polytetrafluoroethylene and then making porous the mixture thereof through expansion.

[12] The catalyst part according to any one of Aspects 1 to 11, further including an inner hydrophobic porous member being capable of repelling moisture, allowing gas to pass, and trapping particulate matter, wherein the inner hydrophobic porous member is located closer to the inside of the lead-acid battery than the catalyst layer is.

[13] The catalyst part according to Aspect 12, further including a substance capable of absorbing a catalytic poison inside the inner hydrophobic porous member.

[14] The catalyst part according to Aspect 13, wherein the substance capable of absorbing a catalytic poison is arranged in the cavities or on the surface of the pores of a hydrophobic porous member.

[15] The catalyst part according to Aspect 14, wherein the hydrophobic porous member is made by mixing the substance capable of absorbing a catalytic poison with polytetrafluoroethylene and then making porous the mixture thereof.

[16] The catalyst part according to Aspect 14 or 15, wherein the hydrophobic porous member is made by mixing the substance capable of absorbing a catalytic poison with polytetrafluoroethylene and then making porous the mixture thereof through expansion.

[17] The catalyst part according to any one of Aspects 12 to 16, wherein at least part of the arrangement is arranged on the periphery of the inner hydrophobic porous member.

[18] The catalyst part according to any one of Aspects 1 to 17, wherein at least part of the arrangement further includes a spacer defining a space above the catalyst layer.

[19] The catalyst part according to Aspect 18, wherein the spacer is a woven fabric, a nonwoven fabric, a knitted fabric, a porous membrane, a flame arrester (an explosion-proof filter), a column spacer, or an O-ring.

[20] The catalyst part according to any one of Aspects 1 to 19, further including an outer hydrophobic porous member being capable of repelling moisture, allowing gas to pass, wherein the outer hydrophobic porous member is located closer to the outside of the lead-acid battery than the catalyst layer is.

[21] The catalyst part according to any one of Aspects 1 to 20, further including a diffusion channel member capable of suppressing water vapor diffusion and allowing gas to pass, wherein the diffusion channel member is located closer to the outside of the lead-acid battery than the catalyst layer is.

[22] The catalyst part according to any one of Aspects 1 to 21, wherein at least part of the water or water vapor generated by catalysis is repelled by or passes through the inner hydrophobic porous member, the catalyst layer, and/or the outer hydrophobic porous member, and is caused to flow back to the inside of the lead-acid battery.

[23] The catalyst part according to any one of Aspects 1 to 22, further including a baffle located closer to the inside of the lead-acid battery than the catalyst layer is, wherein the baffle prevents a gas flow from an electrolyte solution inside the lead-acid battery from reaching the catalyst layer.

[24] The catalyst part according to any one of Aspects 1 to 23, further including a baffle located closer to the inside of the lead-acid battery than the catalyst layer is, wherein the baffle leans toward the inside of the lead-acid battery and facilitates sliding down of liquid drops to the inside of the lead-acid battery.

[25] The catalyst part according to any one of Aspects 1 to 24, further including an aerosol separator located closer to the inside of the lead-acid battery than the catalyst layer is, the aerosol separator having a tube having a first open end located closer to the electrolyte solution inside the lead-acid battery and a second open end located farther away from the electrolyte solution and communicating with the catalyst layer, wherein a gas flow from the electrolyte solution is detoured radially outward in the tube and turned toward the catalyst layer, thereby centrifugally separating liquid drop components contained in the gas flow.

[26] The catalyst part according to any one of Aspects 1 to 25, wherein at least one of the inner hydrophobic porous member, the catalyst layer, and the outer hydrophobic porous member is made of porous polytetrafluoroethylene.

[27] The catalyst part according to any one of Aspects 21 to 26, wherein the diffusion channel member has a structure to allow a gas to leak when the pressure inside the lead-acid battery exceeds a prescribed value, thereby reducing the pressure inside the lead-acid battery.

[28] The catalyst part according to any one of Aspects 20 to 27, further including a double-lid structure to flow back water repelled by the third hydrophobic porous member (ePTFE membrane (hydrophobic)) to the inside of the lead-acid battery.

[29] The catalyst part according to Aspect 28, wherein at least part of the double-lid structure is constructed in the space (defined by the spacer).

[30] The catalyst part according to any one of Aspects 1 to 29, wherein when the lead-acid battery includes cells, each of the cells is provided with the catalyst part.

[31] The catalyst part according to any one of Aspects 9 to 30, wherein the support contains a carbon material.

[32] A ventilation filter for a lead-acid battery, including the catalyst part according to any one of Aspects 1 to 31.

[33] A ventilation plug for a lead-acid battery, including the catalyst part according to any one of Aspects 1 to 31.

[34] A lead-acid battery including the catalyst part according to any one of Aspects 1 to 31.

Effects of the Invention

The present invention provides a catalyst part for a lead-acid battery, the catalyst part being capable of reducing gas release from an electrolyte solution and a decrease in electrolyte solution due to the leakage, thus providing a lead-acid battery having a long life.

DESCRIPTION OF EMBODIMENTS

The catalyst part for a lead-acid battery provided by the present invention includes a catalyst layer including a catalyst to accelerate a reaction for generating water or water vapor from oxygen and hydrogen, and an arrangement through which at least part of the water or water vapor is condensed and/or flowed back to the inside of the battery.

Figure 1:
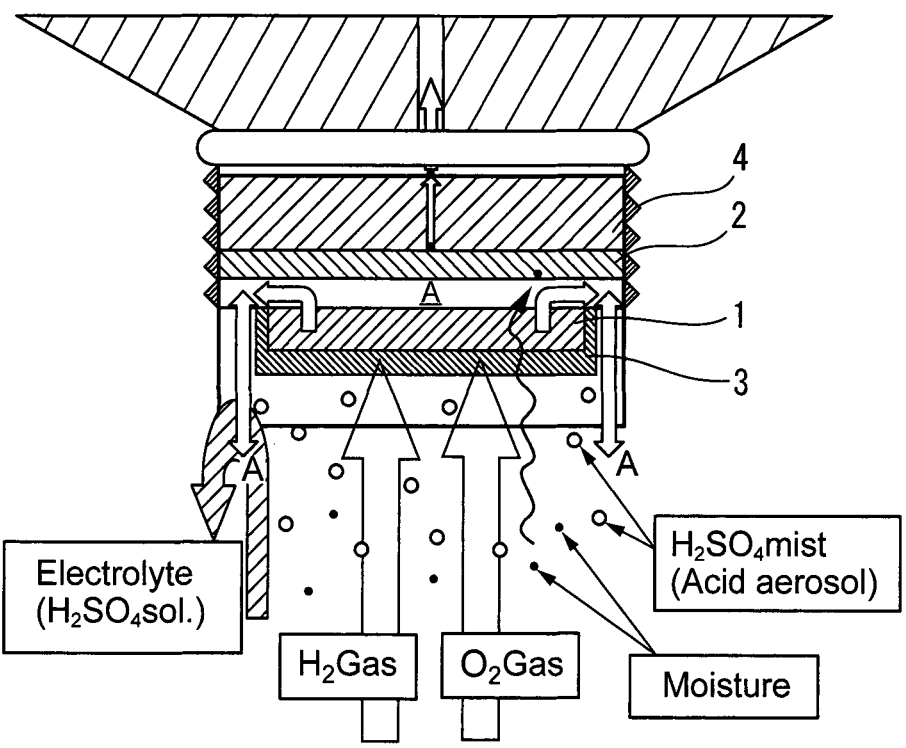
FIG. 1 is a schematic diagram according to one aspect of the present invention.

FIG. 1 is, a diagram schematically illustrating a catalyst part according to one aspect of the present invention. One aspect of the present invention will be described with reference to FIG. 1. FIG. 1 illustrates a ventilation filter of a lead-acid battery. The ventilation filter includes a catalyst part of the present invention. The underside of the figure is the inside of the battery, and the upside of the figure is the outside of the battery. There is an electrolyte solution (not shown) on the underside of the ventilation filter (the inside of the battery). Since the electrolyte solution in a lead-acid battery is an aqueous dilute sulfuric acid solution, the electrolyte solution (aqueous dilute sulfuric acid solution), sulfuric acid mist, moisture, and hydrogen gas and oxygen gas generated by a battery reaction are present in the internal space of the battery. These components can reach the ventilation filter.

When hydrogen gas and oxygen gas reach a catalyst layer (1), which includes a catalyst to accelerate a reaction for generating water or water vapor from oxygen and hydrogen, the reaction for generating water or water vapor proceeds in the catalyst layer (1). The catalyst part of the present invention includes a specific arrangement. The arrangement includes a space in which at least part of the water or water vapor generated is able to be condensed. The arrangement also includes a path through which the water or water vapor generated by the catalysis and the water condensed in the space can be flowed back to the inside of the battery. It should be noted that at least part or all of the space can be the path and at least part or all of the path can be the space. (A) in FIG. 1 represents one example of the arrangement, i.e., one example of the space where at least part of the water or water vapor generated is able to be condensed and the path through which the water or water vapor generated by the catalysis and the water condensed in the space can be flowed back to the inside of the battery.

According to the catalyst part of the present invention, hydrogen gas and oxygen gas, generated by a battery reaction, recombine in the catalyst layer (1) to form water or water vapor, and the water or water vapor is further condensed and/or flowed back to the inside of the battery through the above-described arrangement, which results in a reduced decrease in electrolyte solution inside the battery. The water generated in the catalyst layer (1) can be released in the form of liquid as well as in the form of water vapor. This is particularly advantageous when a battery is repeatedly put into and out of operation, such as in the case of an automotive battery. The reason is that when a battery in operation is put out of operation, the temperature of the battery decreases, and water or water vapor generated until then is readily condensed into a liquid. In other words, the use of the catalyst part of the present invention eliminates the need for temperature control for forming water vapor as in Patent Literature 6.

Furthermore, the catalyst part of the present invention is gas permeable as a whole. The gas permeability can be obtained by adjusting the porosity or the filling ratio of the catalyst in the catalyst layer, or the air permeability of the arrangement, etc. Thereby, when the pressure inside of the battery exceeds a certain value, the gas can be discharged out of the battery to reduce the pressure inside the battery. The certain value of the pressure may be selected in view of the pressure resistance of the material of a casing of the battery, or in view of the gas permeability of a part except for the catalyst part, for example, safety valve, etc. As the result, the catalyst part being gas permeable as a whole, can improve the explosion-proofness of the battery, to avoid fatal damage to the battery and helps improve safety.

The catalyst part of the present invention may further include a member capable of promoting the condensation of at least part of the water or water vapor generated (a condensation-promoting member) on the catalyst layer (1) (such that the member is in contact with the catalyst layer (1)). In the catalyst layer (1), hydrogen gas and oxygen gas react with each other. This reaction is an exothermic reaction, and reaction products thereof are typically in the form of water vapor. Water vapor, which is in the form of a gas, is more likely to leak out of the battery than liquid water (condensed water). The condensation-promoting member on the catalyst layer (1) promotes the condensation of water vapor into water (liquid) and thus suppresses the leakage of water vapor out of the battery, which results in a reduced decrease in electrolyte solution inside the battery.

The member capable of promoting the condensation may be any member that is capable of suppressing the leakage of water vapor out of the battery, providing an environment at a concentration and temperature at which water vapor can be condensed, and providing the origin of the condensation or the nucleus of growth. Examples include spacers, porous members, and membranous members. A spacer provides a space in which water vapor can be condensed, and the space is defined by the outline (walls) of the spacer itself or the outline (walls) of an adjacent member. In the space, the condensation can be initiated and promoted. Pores of a porous member also provide an outline (walls) and space in which the condensation of water vapor can be initiated and promoted. A membranous member provides an outline (walls) in which water vapor can be condensed.

Examples of the spacer include spacers made of resin materials, such as polypropylene (PP). Examples of the porous member include sintered porous members made of resin materials, such as polypropylene (PP), and expanded porous polytetrafluoroethylene. Examples of the membranous member include woven fabrics, nonwoven fabrics, knitted fabrics, and porous membranes made of resin materials, such as polypropylene (PP) and PTFE.

Preferably, the member capable of promoting the condensation is a hydrophilic member. It is believed that hydrophilic members are suitable for providing an environment at a concentration and temperature at which water vapor is readily condensed. One example of the hydrophilic porous members is expanded polytetrafluoroethylene subjected to a hydrophilization treatment. In the hydrophilization treatment, a metal oxide gel may be used. Specifically, a sol of a hydrophilic metal oxide is provided, and a porous member is immersed in the sol, which gelates afterward. In this manner, the inner surface of pores of the porous member can be modified by the hydrophilic oxide gel.

Alternatively, based on the sol-gel process, the surface of the member may be coated with a silica material for hydrophilization.

The catalyst part of the present invention may include a wall member extending from the adjacence to the periphery of the catalyst layer (1) toward the inside of the lead-acid battery, and at least part of the water or water vapor generated by the catalysis is able to be condensed on the wall member.

The water or water vapor generated in the catalyst layer (1) is present inside the catalyst layer (1) immediately after generation and can diffuse away from the catalyst layer (1) depending on the concentration gradient and temperature gradient of the water or water vapor outside the catalyst layer (1). On the wall member provided at the adjacence to the periphery of the catalyst layer (1), at least part of the water or water vapor generated by the catalysis is condensed. The waterdrops condensed are further flowed back to the inside of the battery along the wall extending toward the inside of the battery. Consequently, diffusion of the water or water vapor generated in the catalyst layer (1) to other places than the inside the battery is suppressed, which results in a reduced decrease in electrolyte solution inside the battery. Particularly when the battery includes cells, each of the cells is preferably provided with the wall member. Hydrogen and oxygen are generated from the electrolyte solution in each cell and recombine to generate water or water vapor. The water or water vapor generated can move to other cells than the cell from which the water or water vapor is derived. In this case, the amount of electrolyte solution can differ from cell to cell. When each of the cells is provided with the wall member, water or water vapor derived from a cell tends to be flowed back to the cell and can be prevented from moving to other cells. This is useful for avoiding the difference in the amount of electrolyte solution from cell to cell.

In the catalyst part of the present invention, at least part of the above-described arrangement (through which at least part of the water or water vapor generated by catalysis is condensed and/or flowed back to the inside of the lead-acid battery) may be arranged on the periphery of the catalyst layer (1). The water or water vapor generated in the catalyst layer (1) is present inside the catalyst layer (1) immediately after generation and can diffuse out of the catalyst layer (1) depending on the concentration gradient and temperature gradient of the water or water vapor outside the catalyst layer (1). Through the arrangement, at least part of the water or water vapor generated by catalysis is condensed and/or flowed back to the inside of the lead-acid battery, and since the arrangement is arranged on the periphery of the catalyst layer (1), the water or water vapor is less likely to diffuse out of the arrangement, which results in a reduced decrease in electrolyte solution inside the battery.

In the catalyst part of the present invention, the catalyst layer (1) may include a hydrophobic porous member. In the catalyst layer (1), hydrogen gas and oxygen gas generated by a battery reaction recombine to form water or water vapor, and the catalyst layer (1) therefore tends to be humid. When a catalyst is covered by water or water vapor, hydrogen gas and oxygen gas is less likely to come into contact with the catalyst, and the catalyst reaction (recombination reaction) tends to be less efficient. The hydrophobic porous member in the catalyst layer (1) facilitates the release of the water or water vapor generated out of the catalyst layer (1) to prevent a decrease in efficiency of the catalyst reaction (recombination reaction). The hydrophobic porous member also facilitates the flowing back of the water or water vapor generated to the electrolyte solution inside the battery.

Figure 2:
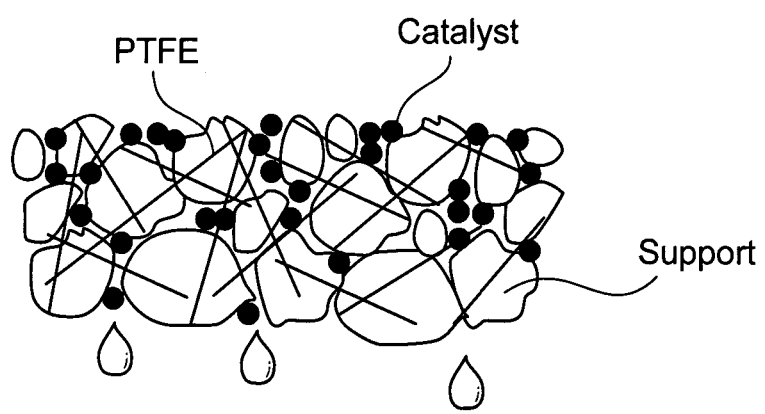
FIG. 2 is a conceptual diagram illustrating a catalyst support arranged in the cavities or on the surface of the pores of a hydrophobic porous member.

Preferably, in the catalyst layer (1), a catalyst support supporting a catalyst may be arranged in the cavities or on the surface of the pores of the catalyst layer (1) (or the hydrophobic porous member) (see FIG. 2). In this case, the catalyst support, in particular, the catalyst is exposed in the cavities of the catalyst layer (1) and readily comes into contact with hydrogen gas and oxygen gas, facilitating the reaction to generate water. When the catalyst layer (1) includes a hydrophobic porous member, water generated is readily released by the hydrophobic porous member in the vicinity, increasing the life of the catalyst. The hydrophobic porous member also facilitates the flowing back of the water or water vapor generated to the electrolyte solution inside the battery.

The catalyst layer (1) may be in other forms than the above, and the catalyst support may be in the form of powder, molded powder, or pelletized powder.

The catalyst layer (1) (or the hydrophobic porous member) is preferably unreactive with other materials inside the battery, such as salts of sulfuric acid. For example, polypropylene and PTFE can be used, and woven fabrics, nonwoven fabrics, knitted fabrics, and porous membranes thereof may also be used. The catalyst layer (1) (or the hydrophobic porous member) may be porous polytetrafluoroethylene (PTFE). Polytetrafluoroethylene, which by nature has excellent properties such as hydrophobicity, chemical resistance, UV resistance, oxidation resistance, and heat resistance, is suitable as a constituent material of a battery. Making porous can be achieved using a blowing agent. Alternatively, for example, expanding polytetrafluoroethylene can readily provide a porous member. More particularly, expanded porous polytetrafluoroethylene is composed of nodes (knots) and fibrils (small fibers). A catalyst or a catalyst support is held in microcavities (micropores) defined by the nodes and/or the fibrils. The nodes and the fibrils are both made of polytetrafluoroethylene, and the difference between them is thought to be due to the difference in the state of aggregation or crystallization of polytetrafluoroethylene molecules. Generally, it is believed that a node is an aggregate of polytetrafluoroethylene primary particles interconnected by minute crystal ribbons, whereas a fibril is made of a bundle of crystal ribbons that are drawn from the primary particles and fully expanded.

The catalyst layer (1) (or the hydrophobic porous member) may be produced by mixing a catalyst support and polytetrafluoroethylene and then making porous the mixture thereof or making porous the mixture thereof through expansion. Through the expansion of a catalyst support and polytetrafluoroethylene mixed in advance, microcavities defined by nodes and/or fibrils are formed in polytetrafluoroethylene, in which microcavities the catalyst support is held.

Alternatively, an expanded porous PTFE fiber containing a catalyst support and/or a catalyst itself may be produced by mixing polytetrafluoroethylene with the catalyst support and/or the catalyst itself and expanding the mixture. Woven fabrics and felts produced using the fiber may be used as the catalyst layer (1). Combining porous PTFE fibers containing different amounts of catalyst can produce, for example, a woven fabric or a felt made up of the catalyst layer (1) and a below-described outer hydrophobic porous member (2) integrated with each other.

Preferably, an inner hydrophobic porous member (3) being capable of repelling moisture, allowing gas to pass, and trapping particulate matter may be arranged closer to the inside of the lead-acid battery than the catalyst layer (1) is. The term "inner" refers to being located closer to the inside of the battery than the catalyst layer is. Other members (e.g., a baffle and an aerosol separator described below) may be present inner than the inner hydrophobic porous member (3). The inner hydrophobic porous member (3), which is capable of allowing gas to pass, does not inhibit hydrogen gas and oxygen gas from reaching the catalyst layer (1). Furthermore, the inner hydrophobic porous member (3) is capable of preventing sulfuric acid mist and an electrolyte solution (an aqueous dilute sulfuric acid solution) from coming into direct contact with the catalyst of the catalyst layer (1) to increase the life of the catalyst.

The inner hydrophobic porous member (3) is preferably unreactive with other materials inside the battery, such as salts of sulfuric acid. For example, polypropylene and PTFE can be used, and woven fabrics, nonwoven fabrics, knitted fabrics, and porous membranes thereof may also be used. The inner hydrophobic porous member (3), similarly to the catalyst layer (1), may be porous polytetrafluoroethylene. Polytetrafluoroethylene, which has excellent properties such as hydrophobicity, chemical resistance, UV resistance, oxidation resistance, and heat resistance, is suitable as a constituent material of a battery. Alternatively, for example, expanding polytetrafluoroethylene can readily provide a porous member.

Preferably, at least one of the inner hydrophobic porous member (3) and the catalyst layer (1) may include a substance capable of absorbing a catalytic poison. One example of the catalytic poison is H2S, which is generated from dilute sulfuric acid in an electrolyte solution. The catalytic poison such as H2S, when coming into contact with a catalyst, reduces its catalytic performance. The substance capable of absorbing a catalytic poison may be ZnO, which is capable of absorbing a catalytic poison such as H2S. Thus, when at least one of the inner hydrophobic porous member (3) and the catalyst layer (1) includes a substance capable of absorbing a catalytic poison, such as ZnO, the decrease in catalytic performance can be reduced.

Preferably, in the inner hydrophobic porous member (3), the substance capable of absorbing a catalytic poison may be arranged in the cavities or on the surface of the pores of the inner hydrophobic porous member (3). In this case, the substance capable of absorbing a catalytic poison is exposed in the cavities of the inner hydrophobic porous member (3) and readily comes into contact with a catalytic poison such as H2S, facilitating the absorption of the catalytic poison. The inner hydrophobic porous member (3) is capable of passing or repelling the water or water vapor generated in the catalyst layer (1) to facilitate the flowing back of the water or water vapor to the electrolyte solution inside the battery.

The inner hydrophobic porous member (3) may be produced by mixing a substance capable of absorbing a catalytic poison and polytetrafluoroethylene and then making porous the mixture thereof or making porous the mixture thereof through expansion. Through the expansion of a substance capable of absorbing a catalytic poison and polytetrafluoroethylene mixed in advance, microcavities defined by nodes and/or fibrils are formed in polytetrafluoroethylene, in which the substance capable of absorbing a catalytic poison is held.

Alternatively, an expanded porous PTFE fiber containing a catalyst support and/or a catalyst itself may be produced by mixing polytetrafluoroethylene with the catalyst support and/or the catalyst itself and expand the mixture. Woven fabrics and felts produced using the fiber may be used as the inner hydrophobic porous member (3).

In the catalyst part of the present invention, at least part of the above-described arrangement (through which at least part of the water or water vapor generated by catalysis is condensed and/or flowed back to the inside of the lead-acid battery) may be arranged on the periphery of the inner hydrophobic porous member (3). The water or water vapor generated in the catalyst layer (1) is present inside the catalyst layer (1) immediately after generation and can diffuse away from the catalyst layer (1) depending on the concentration gradient and temperature gradient of the water or water vapor outside the catalyst layer (1). Thus, part of the water or water vapor generated in the catalyst layer (1) may diffuse to the periphery of the inner hydrophobic porous member (3). Through the arrangement, at least part of the water or water vapor generated by catalysis is condensed and/or flowed back to the inside of the lead-acid battery, and since the arrangement is arranged on the periphery of the inner hydrophobic porous member (3), the water or water vapor is less likely to diffuse out of the arrangement, which results in a reduced decrease in electrolyte solution inside the battery.

In the catalyst part of the present invention, at least part of the above-described arrangement (through which at least part of the water or water vapor generated by catalysis is condensed and/or flowed back to the inside of the lead-acid battery) may include a spacer defining a space above the catalyst layer. The spacer, located above the catalyst layer, may be, but not necessarily, in contact with the catalyst layer. In other words, other members may be present between the catalyst layer and the spacer.

The spacer may be any spacer capable of defining a space, such as a woven fabric, a nonwoven fabric, a knitted fabric, a porous membrane, a mesh, a column spacer, or an O-ring. The spacer is preferably made of a material unreactive with other materials inside the battery, such as salts of sulfuric acid. For example, polypropylene and PTFE can be used. The spacer provides a space in which water vapor can be condensed, and the space is defined by the outline (walls) of the spacer itself or the outline (walls) of an adjacent member. In the space, the condensation can be initiated and promoted. The space defined by the spacer can serve as a buffer capable of temporarily retaining solutions and other substances.

Furthermore, when the catalyst part includes the outer hydrophobic porous member (2) described below, the spacer is preferably arranged between the catalyst layer (1) and the outer hydrophobic porous member (2). When there is a space between the catalyst layer (1) and the outer hydrophobic porous member (2), the outer hydrophobic porous member (2), which is for preventing an electrolyte solution (an aqueous dilute sulfuric acid solution) and other substances from leaking out of the battery, repels water and prevents the electrolyte solution from leaking out more effectively than when the catalyst layer (1) and the outer hydrophobic porous member (2) are in contact.

The outer hydrophobic porous member (2), which repels moisture and allows gas to pass, may be arranged closer to the outside of the lead-acid battery than the catalyst layer (1) is. The term "outer" refers to being located closer to the outside of the battery than the catalyst layer (1) is. Other members (e.g., a diffusion channel member and a double-lid structure described below) may be present outer than the outer hydrophobic porous member (2). When an electrolyte solution (an aqueous dilute sulfuric acid solution) and other substances pass through the catalyst layer (1) and/or the above-described arrangement and flow toward the outside of the battery, the outer hydrophobic porous member (2) repels the electrolyte solution and other substances to prevent them from leaking out of the battery. Even if at least part of the water generated in the catalyst layer (1) reaches the outer hydrophobic porous member (2), the water is repelled by the outer hydrophobic porous member (2) and, as a result, readily flowed back to the electrolyte solution inside the battery via the catalyst layer (1) and/or the arrangement.

The outer hydrophobic porous member (2) is preferably unreactive with other materials inside the battery, such as salts of sulfuric acid. For example, polypropylene and PTFE can be used, and woven fabrics, nonwoven fabrics, knitted fabrics, and porous membranes thereof may also be used. The outer hydrophobic porous member (2), similarly to the catalyst layer (1), may be porous polytetrafluoroethylene. Polytetrafluoroethylene, which has excellent properties such as hydrophobicity, chemical resistance, UV resistance, oxidation resistance, and heat resistance, is suitable as a constituent material of a battery. Alternatively, for example, expanding polytetrafluoroethylene readily provides a porous member.

Figure 5:
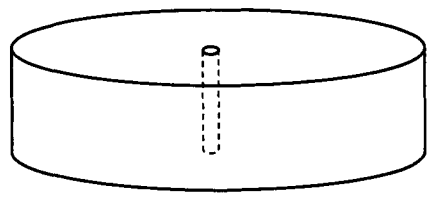
FIG. 5 is a schematic diagram illustrating a diffusion channel according to one aspect.

Preferably, a diffusion channel member (4), capable of suppressing water vapor diffusion and allowing gas to pass, may be arranged closer to the outside of the lead-acid battery than the outer hydrophobic porous member (2) is. When moisture derived from an electrolyte solution and water vapor derived from the water generated in the catalyst layer (1) passes through the outer hydrophobic porous member (2), a channel in the member (4) suppresses the moisture, so that the moisture is not allowed to diffuse out of the battery. FIG. 5 illustrates one aspect of the diffusion channel. The diffusion channel in FIG. 5 is made of a resin material having a thin hole for suppressing water vapor diffusion. In other words, the narrow channel hinders the moisture from further diffusing. This results in a reduced decrease in electrolyte solution. The degree of suppression of water vapor diffusion can be controlled by adjusting the diameter and length of the thin hole. The resin material used for the diffusion channel member is preferably resistant to sulfuric acid. Examples include vinyl chloride resins, vinylidene chloride resins, polyvinyl alcohol resins, polyvinyl acetate resins, polystyrene resins, ABS resins, polyethylene resins, polypropylene resins, polyisobutylene resins, polyamide resins, polyacetal resins, methacrylic resins, polycarbonates, fluorocarbon resins, cellulose acetate resins, and chlorinated polyether resins.

Figure 6:
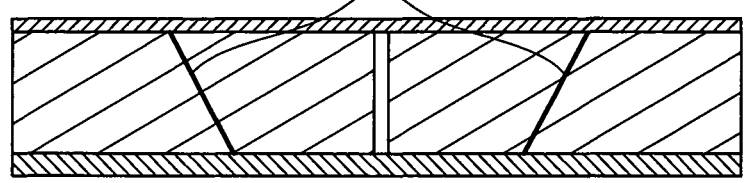
FIG. 6 is a schematic diagram illustrating the gas leakage structure of a diffusion channel according to one aspect.
Figure 6:
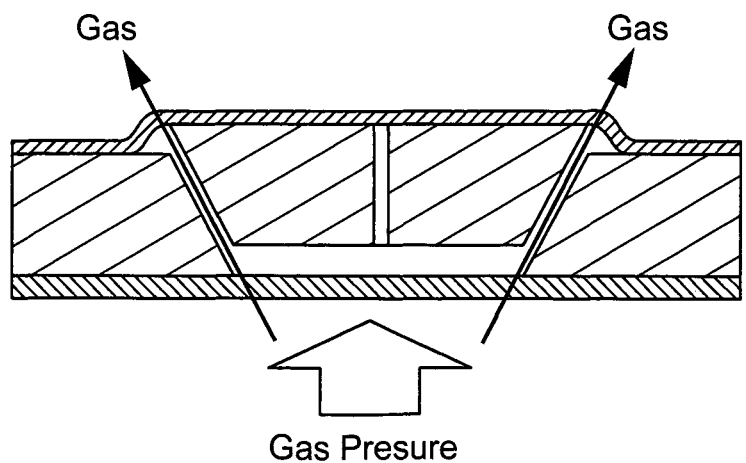

The diffusion channel member (4) is capable of allowing gas to pass. When the pressure inside the battery is rapidly increased, the diffusion channel member (4) is capable of discharging the gas out of the battery to reduce the pressure inside the battery. This improves the explosion-proofness of the battery. More preferably, the diffusion channel member may have a structure to allow a gas to leak when the pressure inside the lead-acid battery exceeds a prescribed value. For example, as shown in FIG. 6, the diffusion channel member may be cut such that an inverted truncated cone is formed, and a nonwoven fabric or other material may be laminated on the diffusion channel member such that the upper surface of the inverted truncated cone is covered. In this structure, when the pressure inside the battery is increased, the inverted truncated cone is lifted up to create a through hole in the diffusion channel member, through which hole the internal gas can be released. Since the inverted truncated cone is covered by a nonwoven fabric, the inverted truncated cone is prevented from being blown away and separated from the diffusion channel member. In this manner, the pressure inside the lead-acid battery can be reduced when the pressure inside the battery exceeds a prescribed value. The prescribed pressure at which leakage occurs may be selected in view of the pressure resistance of the material of a casing of the battery. This structure avoids a fatal damage to the battery and helps improve the safety.

At least part of the water or water vapor generated by catalysis may be repelled by or may pass through the inner hydrophobic porous member (3), the catalyst layer (1), and/or the outer hydrophobic porous member (2) to be flowed back to the inside of the lead-acid battery. Although the catalyst part of the present invention includes the arrangement through which at least part of the water or water vapor generated by catalysis is condensed and/or flowed back to the inside of the lead-acid battery, at least part of the water or water vapor can be flowed back to the inside of the lead-acid battery not through the arrangement but through the catalyst layer (1) and/or the other components.

Preferably, a baffle may be arranged closer to the inside of the lead-acid battery than the catalyst layer (1) is. The baffle is capable of preventing an electrolyte solution inside the lead-acid battery and a gas flow from the electrolyte solution, such as oxygen and hydrogen, from reaching the catalyst layer (1). This reduces the decrease in electrolyte solution.

Figure 3:
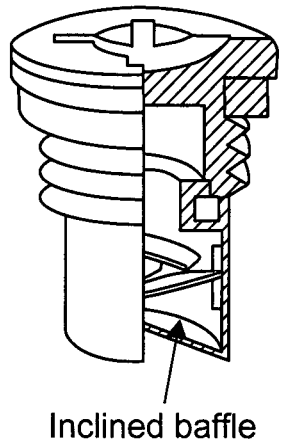
FIG. 3 is a schematic diagram illustrating an inclined baffle according to one aspect.

More preferably, the baffle may lean toward the inside of the lead-acid battery. The inclined baffle facilitates sliding down of liquid drops to the inside of the lead-acid battery to further reduce the decrease in electrolyte solution. FIG. 3 is a schematic view of an inclined baffle according to one embodiment.

Figure 4:
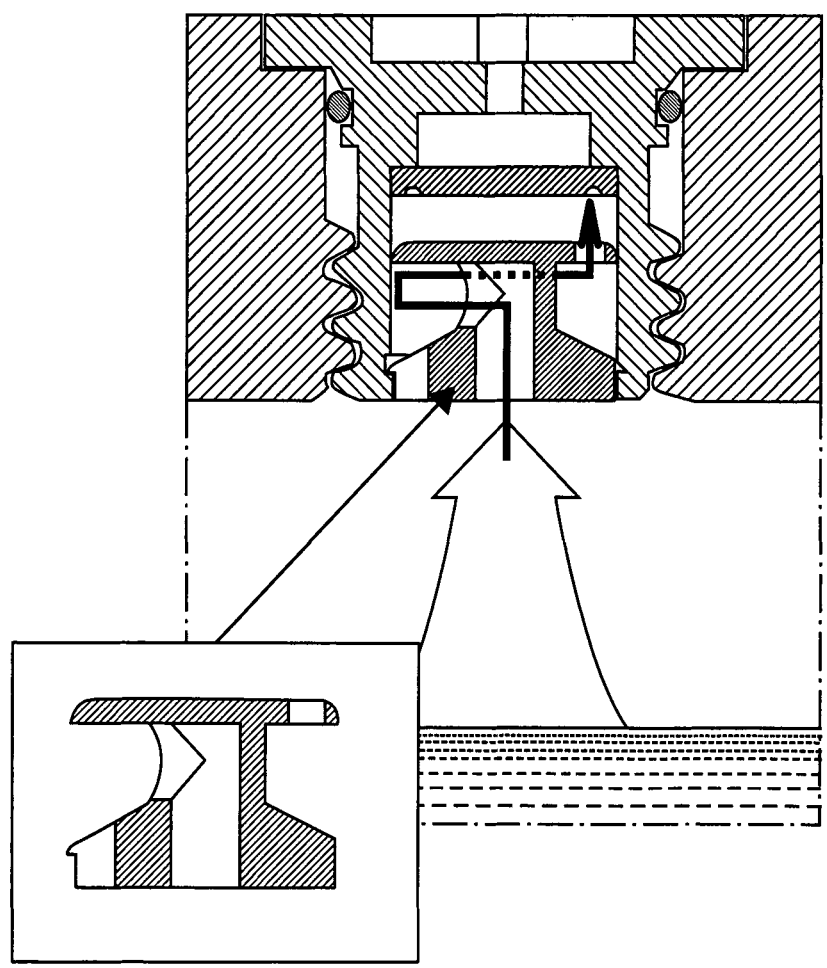
FIG. 4 is a schematic diagram illustrating an aerosol separator according to one aspect.

Preferably, an aerosol separator may be arranged closer to the inside of the lead-acid battery than the catalyst layer (1) is. The aerosol separator has a tube having a first open end located closer to the electrolyte solution inside the lead-acid battery and a second open end located farther away from the electrolyte solution and communicating with the first hydrophobic porous member. Gases such as oxygen and hydrogen from the electrolyte solution flow into the tube through the first closer open end, and the gas flow is detoured radially outward in the tube. The gas flow detoured is turned toward the second farther open end, i.e., the catalyst layer (1). While the gases flow from the first open end to the second open end, liquid drop components contained in the gas flow are centrifugally separated. FIG. 4 is a schematic view of an aerosol separator according to one embodiment.

The gas flow from the electrolyte solution is detoured radially outward in the tube and turned toward the catalyst layer (1), thereby centrifugally separating liquid drop components contained in the gas flow. The liquid drops separated are flowed back to the electrolyte solution by their own weight. This reduces the decrease in electrolyte solution.

Preferably, the catalyst part of the present invention may have a double-lid structure. Mist and water vapor of an electrolyte solution can pass through the outer hydrophobic porous member (2) toward the outside of the battery. The double-lid has a structure to collect condensate of such gases condensed on the walls (and the ceiling and the floor) of the double-lid before leaking out of the battery and flow back the condensate to the inside of the battery. To efficiently condense the gases and collect the condensate, the ceiling and the floor may be leaned, and the walls may be notched. Furthermore, to flow back the liquid collected to the inside of the battery in an equally divided manner, a flow-back channel may be provided in the double-lid.

At least part of the double-lid structure may be constructed in the above-described arrangement (through which at least part of the water or water vapor generated by catalysis is condensed and/or flowed back to the inside of the lead-acid battery). The arrangement includes a space where at least part of the water or water vapor generated is able to be condensed. In this space, the walls (and the ceiling and the floor) of the double-lid can be constructed to promote the condensation. The arrangement also includes a path for flowing back the water vapor and condensed water to the inside of the battery, and this path may be part of the flow-back channel of the double-lid.

The lead-acid battery may include cells. In this case, each of the cells may be provided with the catalyst part of the present invention. When there are cells, catalytically generated water or water vapor derived from an electrolyte solution in a cell can move to other cells. In this case, the amount of electrolyte solution can differ from cell to cell. At least one catalyst part in each cell may help hydrogen gas and oxygen gas generated in each cell to recombine in the catalyst layer (1) in each cell and help the water or water vapor generated to flow back to the cell (the cell from which the water or water vapor is derived). This is useful for avoiding the difference in the amount of electrolyte solution from cell to cell.

The catalyst layer (1) may include a catalyst support supporting a catalyst metal. The catalyst metal may be any catalyst for recombining hydrogen and oxygen to form water, and examples include Pd, Pt, and Au. The support supporting a catalyst may be any support having a specific surface area sufficient to support the catalyst in a desired dispersed state. The support can be selected from the group consisting of silica, alumina, zeolite, carbon, oxides and carbides of Group IVB, VB, VIB, VIIB, and VIII transition metals, and combinations thereof. Alternatively, the support may be a carbon material. It is not preferred that a supporting material effect a chemical reaction other than the desired reaction or substances constituting the supporting material be eluted upon contact with condensed water. In this regard, carbon materials are chemically stable and preferred supporting materials. Examples of carbon materials include carbon black (e.g., oil furnace black, channel black, lamp black, thermal black, and acetylene black), activated carbon, coke, natural graphite, and artificial graphite. These may be used in combination.

In another aspect of the present invention, a ventilation filter for a lead-acid battery, including the catalyst part described above, is provided. In yet another aspect of the present invention, a ventilation plug for a lead-acid battery, including the catalyst part described above, is provided. In still yet another aspect of the present invention, a lead-acid battery including the catalyst part described above is provided. The ventilation filter and the ventilation plug can be used as individual articles, and can be substituted for existing ventilation filters and ventilation plugs of lead-acid batteries. Furthermore, the catalyst part described above is capable of reducing leakage of an electrolyte solution, gas release from an electrolyte solution, and the decrease in electrolyte solution due to the leakage and the release, thus providing a lead-acid battery having a long life.

EXAMPLES

The present invention will now be described in more detail with reference to examples and comparative examples. The following examples, however, should not be construed as limiting the present invention.

As indicated in Table 1, catalyst parts were produced using materials in various combinations.

Hydrogen and oxygen were fed to each catalyst part, and the amount of moisture (water and water vapor) flowed back was measured. Based on the measurements, the flowback performance of the catalyst parts was determined.

A more specific test method will be described. To simulate a lead-acid battery, a chamber was provided, and the catalyst part produced was attached to the chamber. An electrolyte solution was not used. Instead, hydrogen gas (4 ml/min) and oxygen gas (2 ml/min) were fed from the inside of the chamber to the catalyst part. Oxygen and hydrogen were fed in two systems. In a feeding system (1), oxygen and hydrogen were continuously fed for 24 hours. In a feeding system (2), a cycle of feeding oxygen and hydrogen for 1 hour and then suspending the feeding for 5 hours was repeated 24 times.

The flowback performance of a catalyst part is defined by the amount (%) of water collected in the chamber after testing, based on the amount of water or water vapor that can be formed when all the oxygen and hydrogen fed are recombined. Result 1 is a flowback performance in the feeding system (1), and Result 2 is a flowback performance in the feeding system (2).

Furthermore, for each catalyst part, the cycle of the feeding system (2) (feeding source gases for 1 hour and then suspending the feeding for 5 hours) was repeated for 50 times. The retention of the flowback performance at the 50th cycle based on the flowback performance at the 1st cycle was determined and used as the degree of catalyst degradation (catalyst life).

Example 1 includes no catalyst layer. The flowback performances were 0% for both Result 1 and Result 2.

Example 2 simulates a catalyst part including a catalyst layer alone and includes no arrangement (through which at least part of water or water vapor generated by catalysis is condensed and/or flowed back to the inside of a lead-acid battery). To provide a catalyst part including no arrangement, the periphery of the catalyst layer was covered with ePTFE, a hydrophobic porous membrane (source gases are capable of passing through ePTFE). The catalyst layer is a molded product of a carbon particle material supporting Pd (catalyst metal).

The flowback performances were 70% (Result 1) and 30% (Result 2). The catalyst life (the degree of catalyst degradation) was 30%. In the feeding system (1), it is presumed that oxygen and hydrogen were continuously fed and uninterruptedly recombined (exothermic reaction) to form products in the state of water vapor, thus achieving a relatively high flowback performance (Result 1). In the feeding system (2), it is presumed that no catalyst reaction occurred during the suspension of the feeding of source gases to decrease the temperature of the catalyst layer, as a result of which the moisture generated was increasingly condensed, and the catalyst layer was covered with water, resulting in a reduced catalyst activity. The degree of catalyst degradation (catalyst life) was 30%, indicating a significant degradation.

In Example 3, pellets of an alumina particle material supporting Pd (catalyst metal) were used as the catalyst layer. The catalyst part of Example 3 includes hydrophilized ePTFE in order to support the catalyst layer. The hydrophilized ePTFE is capable of allowing liquid moisture to pass and acting as part of an arrangement (through which at least part of water or water vapor generated by catalysis is condensed and/or flowed back to the inside of a lead-acid battery).

The flowback performances were 65% (Result 1) and 25% (Result 2). The catalyst life (the degree of catalyst degradation) was 30%. Similarly to Example 2, in the feeding system (1), it is presumed that products were in the

TABLE 1

| | Test No. | | | | | | | | | |
|---|---|---|---|---|---|---|---|---|---|---|
| | 1 | 2 | 3 | 4 | 5 | 6 | 7 | 8 | 9 | 10 |
| Result 1 (Flowback Performance) | 0% | 70% | 65% | 60% | 75% | 85% | 75% | 75% | 70% | 70% |
| Result 2 (Flowback Performance) | 0% | 30% | 25% | 50% | 65% | 80% | 68% | 68% | 60% | 63% |
| Catalyst Life (Degree of Degradation) | — | 30% | 30% | 90% | 90% | 90% | 90% | 90% | 90% | 90% |
| Outer Hydrophobic Porous Member | no | yes | no | no | no | no | no | no | no | no |
| Arrangement for Condensation and Flowing Back | no | no *1 | yes hydrophilic ePTFE | yes water-repellent sintered PP | yes sintered PP the bottom of catalyst, exposed | yes PP support | yes PP support | yes PP support | yes sintered PP | yes PP support |
| Condensation-Promoting Member | no | no | no | no | no | yes (hydrophilic ePTFE) | yes (nonporous PTFE sheet) | yes (porous sintered PP) | no | no |
| Catalyst Layer | no | yes (powder molding) | yes (pellet) | yes (film) | yes (film) | yes (film) | yes (film) | yes (film) | yes (film) | yes (film) |
| Inner Hydrophobic Porous Member | no | yes | no | yes | no | yes | yes | yes | yes | yes | state of water vapor, thus achieving a relatively high flowback performance (Result 1), whereas in the feeding system (2), it is presumed that the catalyst layer was covered with water, resulting in a reduced catalyst activity. The degree of catalyst degradation (catalyst life) was 30%, indicating a significant degradation.

The catalyst layer of Example 4 was prepared as described below. A carbon support supporting a Pd catalyst was provided. The catalyst support, polytetrafluoroethylene fine powder, and a molding aid were mixed to form a pasty mixture. The mixture was loaded into an extruder and extruded through a die. The extrudate was modified, for example, by calender rolling to a prescribed thickness and shape and then expanded at a temperature not higher than the decomposition temperature of polytetrafluoroethylene (approximately 400° C.). In this manner, an expanded porous polytetrafluoroethylene film in which the catalyst was dispersed was obtained. This film was used as a catalyst layer.

The catalyst part of Example 4 includes ePTFE at the bottom of the catalyst layer in order to support the catalyst layer and a water-repellent sintered porous polypropylene at the top of the catalyst layer. The water-repellent sintered porous polypropylene is capable of allowing water vapor of pass and acting as part of an arrangement (through which at least part of water or water vapor generated by catalysis is condensed and/or flowed back to the inside of a lead-acid battery). The ePTFE at the bottom of the catalyst layer, when practically used in a battery, acts as an inner hydrophobic porous member to help protect the catalyst layer from battery acid and other components.

The flowback performances were 60% (Result 1) and 50% (Result 2). The catalyst life (the degree of catalyst degradation) was 90%. In Example 4, the catalyst life was significantly improved as compared with Examples 2 and 3. While not wishing to be bound by any particular theory, this is probably because polytetrafluoroethylene in the catalyst layer facilitated the release of moisture in the catalyst layer. In Examples 5 to 10 below, the same catalyst layer as in Example 4 was used.

In Example 5, the same catalyst layer as in Example 4 was used. The catalyst part of Example 5 includes a sintered porous polypropylene at the top of the catalyst layer and no member at the bottom of the catalyst layer. The bottom of the catalyst layer is in contact with the atmosphere in a chamber, and at least part of water or water vapor generated by catalysis is condensed and flowed back directly to the inside of a lead-acid battery. The at least part of the water or water vapor is condensed and flowed back to the inside of a lead-acid battery also via the sintered porous polypropylene. In this regard, the catalyst part of Example 5 includes an arrangement (through which at least part of water or water vapor generated by catalysis is condensed and/or flowed back to the inside of a lead-acid battery).

The flowback performances were 75% (Result 1) and 65% (Result 2). The catalyst life (the degree of catalyst degradation) was 90%.

In Example 6, the same catalyst layer as in Example 4 was used. The catalyst part of Example 6 includes a hydrophilized ePTFE sheet at the top of the catalyst layer and a polypropylene support member above the sheet. The catalyst part includes ePTFE at the bottom of the catalyst layer in order to support the catalyst layer. The polypropylene support member is capable of acting as part of an arrangement (through which at least part of water or water vapor generated by catalysis is condensed and/or flowed back to the inside of a lead-acid battery). It is presumed that the hydrophilized ePTFE sheet at the top of the catalyst layer acted as a member for promoting the condensation. The ePTFE at the bottom of the catalyst layer, when practically used in a battery, acts as an inner hydrophobic porous member to help protect the catalyst layer from battery acid and other components.

The flowback performances were 85% (Result 1) and 80% (Result 2). The catalyst life (the degree of catalyst degradation) was 90%.

In Example 7, the same catalyst layer as in Example 4 was used. The catalyst part of Example 7 includes a PTFE sheet (nonporous) at the top of the catalyst layer and a polypropylene support member above the sheet. The catalyst part includes ePTFE at the bottom of the catalyst layer in order to support the catalyst layer. The support member above the catalyst layer is capable of acting as part of an arrangement (through which at least part of water or water vapor generated by catalysis is condensed and/or flowed back to the inside of a lead-acid battery). It is presumed that the PTFE sheet (nonporous) at the top of the catalyst layer acted as a member for promoting the condensation. The ePTFE at the bottom of the catalyst layer, when practically used in a battery, acts as an inner hydrophobic porous member to help protect the catalyst layer from battery acid and other components.

The flowback performances were 75% (Result 1) and 68% (Result 2). The catalyst life (the degree of catalyst degradation) was 90%.

In Example 7, the PTFE sheet (nonporous) was substituted for the hydrophilic ePTFE sheet in Example 6. This difference is probably the reason why the flowback performance in Example 6 was higher than the flowback performance in Example 7.

In Example 8, the same catalyst layer as in Example 4 was used. The catalyst part of Example 8 includes a porous sintered polypropylene at the top of the catalyst layer and a polypropylene support member above the porous sintered polypropylene. The catalyst part includes ePTFE at the bottom of the catalyst layer in order to support the catalyst layer. The support member above the catalyst layer is capable of acting as part of an arrangement (through which at least part of water or water vapor generated by catalysis is condensed and/or flowed back to the inside of a lead-acid battery). It is presumed that the porous sintered polypropylene at the top of the catalyst layer acted as a member for promoting the condensation. The ePTFE at the bottom of the catalyst layer, when practically used in a battery, acts as an inner hydrophobic porous member to help protect the catalyst layer from battery acid and other components.

The flowback performances were 75% (Result 1) and 68% (Result 2). The catalyst life (the degree of catalyst degradation) was 90%.

In Example 8, the porous sintered polypropylene was substituted for the hydrophilic ePTFE sheet in Example 6. This difference is probably the reason why the flowback performance in Example 6 was higher than the flowback performance in Example 8.

In Example 9, the same catalyst layer as in Example 4 was used. The catalyst part of Example 9 includes a sintered porous polypropylene at the top of the catalyst layer. The catalyst part includes ePTFE at the bottom of the catalyst layer in order to support the catalyst layer. The sintered porous polypropylene at the top of the catalyst layer is capable of acting as part of an arrangement (through which at least part of water or water vapor generated by catalysis is condensed and/or flowed back to the inside of a lead-acid battery). The ePTFE at the bottom of the catalyst layer, when practically used in a battery, acts as an inner hydrophobic porous member to help protect the catalyst layer from battery acid and other components.

The flowback performances were 70% (Result 1) and 60% (Result 2). The catalyst life (the degree of catalyst degradation) was 90%.

The catalyst part of Example 9 is the catalyst part of Example 5 plus the ePTFE at the bottom of the catalyst layer. Because of the ePTFE at the bottom of the catalyst layer, the flowback performance in Example 9 was somewhat lower than the flowback performance in Example 5 but at an acceptable level. When the catalyst part is practically used in a battery, the ePTFE at the bottom of the catalyst layer will probably help protect the catalyst layer.

In Example 10, the same catalyst layer as in Example 4 was used. The catalyst part of Example 10 includes a polypropylene support member above the catalyst layer, and the support member defines a space above the catalyst layer. The catalyst part includes ePTFE at the bottom of the catalyst layer in order to support the catalyst layer. The support member above the catalyst layer is capable of acting as part of an arrangement (through which at least part of water or water vapor generated by catalysis is condensed and/or flowed back to the inside of a lead-acid battery). The ePTFE at the bottom of the catalyst layer, when practically used in a battery, acts as an inner hydrophobic porous member to help protect the catalyst layer from battery acid and other components.

The flowback performances were 70% (Result 1) and 63% (Result 2). The catalyst life (the degree of catalyst degradation) was 90%.

The catalyst part of Example 10 is the catalyst part of Example 6 minus a hydrophilic ePTFE sheet. This difference is probably the reason why the flowback performance in Example 6 was higher than the flowback performance in Example 10.

The invention claimed is:

1. A catalyst part for a lead-acid battery, comprising:
a catalyst layer comprising a catalyst;
a porous hydrophilic condensation-promoting member that promotes the condensation of at least part of water vapor on the catalyst layer; and
a space through which at least part of the water condensed by the porous hydrophilic condensation-promoting member is configured to be flowed back to an inside of the lead-acid battery;
wherein the space is configured to be in fluid connection with the porous hydrophilic condensation-promoting member and to an inside of the lead-acid battery; and
wherein the catalyst part is gas permeable as a whole.

2. The catalyst part according to claim 1, wherein the porous hydrophilic condensation-promoting member comprises expanded polytetrafluoroethylene.

3. The catalyst part according to claim 1, further comprising a wall member extending from a location adjacent to the catalyst layer toward the inside of the lead-acid battery, wherein the wall member is positioned such that at least part of the water or water vapor generated by a catalysis reaction is able to be condensed on the wall member.

4. The catalyst part according to claim 1, wherein at least part of the space is arranged on a periphery of the catalyst layer.

5. The catalyst part according to claim 1, wherein the catalyst layer comprises a hydrophobic porous member.

6. The catalyst part according to claim 1, wherein a catalyst support supporting the catalyst is arranged in cavities or on a surface of pores of the catalyst layer.

7. The catalyst part according to claim 1, further comprising an inner hydrophobic porous member, wherein the inner hydrophobic porous member is located closer to the inside of the lead-acid battery than the catalyst layer.

8. The catalyst part according to claim 7, wherein at least part of the space is arranged on a periphery of the inner hydrophobic porous member.

9. The catalyst part according to claim 1, further comprising a spacer defining at least a portion of the space above the catalyst layer.

10. The catalyst part according to claim 9, wherein the spacer is selected from the group consisting of a woven fabric, a nonwoven fabric, a knitted fabric, a porous membrane, a flame arrester (an explosion-proof filter), a column spacer, and an O-ring.

11. The catalyst part according to claim 1, further comprising an outer hydrophobic porous member configured to repel moisture and allow gas to pass, wherein the outer hydrophobic porous member is located closer to an outside of the lead-acid battery than the catalyst layer.

12. The catalyst part according to claim 1, further comprising a diffusion channel member, wherein the diffusion channel member is located closer to an outside of the lead-acid battery than the catalyst layer.

13. The catalyst part according to claim 1, wherein the catalyst part is configured such that at least part of the water or water vapor generated by catalysis passes through at least one of an inner hydrophobic porous member, the catalyst layer, or an outer hydrophobic porous member, and is caused to flow back to the inside of the lead-acid battery.

14. The catalyst part according to claim 1, further comprising a baffle located closer to the inside of the lead-acid battery than the catalyst layer.

15. The catalyst part according to claim 1, further comprising a baffle located closer to the inside of the lead-acid battery than the catalyst layer is, wherein the baffle slopes toward the inside of the lead-acid battery and is configured to facilitate sliding down of liquid drops to the inside of the lead-acid battery.

16. The catalyst part according to claim 1, further comprising an aerosol separator located closer to the inside of the lead-acid battery than the catalyst layer,
wherein the aerosol separator has a tube having a first open end located closer to an electrolyte solution inside the lead-acid battery and a second open end-located farther away from the electrolyte solution and communicating with the catalyst layer,
wherein a gas flow from the electrolyte solution is detoured radially outward in the tube and turned toward the catalyst layer, thereby centrifugally separating liquid drop components contained in the gas flow.

17. The catalyst part according to claim 1, wherein at least one of an inner hydrophobic porous member, the catalyst layer, or an outer hydrophobic porous member comprises porous polytetrafluoroethylene.

18. The catalyst part according to claim 1, wherein when the lead-acid battery comprises cells, each of the cells is provided with the catalyst part.

19. The catalyst part according to claim 6, wherein the catalyst support comprises a carbon material.

* * * * *